United States Patent [19]

Jones et al.

[11] Patent Number: 4,504,235
[45] Date of Patent: Mar. 12, 1985

[54] EDUCATIONAL DEVICE FOR TEACHING COLLATING SKILLS

[75] Inventors: Corey N. Jones, Severn; Thomas Chapline, Laurel, both of Md.

[73] Assignee: PSI Associates, Inc., D.C.

[21] Appl. No.: 624,736

[22] Filed: Jun. 26, 1984

[51] Int. Cl.³ .............................................. G09B 19/00
[52] U.S. Cl. ..................................... 434/219; 211/50; 270/52
[58] Field of Search .......................... 434/219; 270/52; 211/126, 128, 50, 10

[56] References Cited

U.S. PATENT DOCUMENTS

| | | | |
|---|---|---|---|
| 2,156,955 | 5/1939 | Page | 211/126 |
| 2,194,802 | 3/1940 | Low | 270/52 X |
| 2,415,342 | 2/1947 | Donner | 434/171 |
| 2,964,195 | 12/1960 | Valis | 211/126 X |
| 3,024,541 | 3/1962 | Byrum | 434/172 |
| 4,034,864 | 7/1977 | Tyson et al. | 211/50 |

Primary Examiner—William H. Grieb
Attorney, Agent, or Firm—Banner, Birch, McKie & Beckett

[57] ABSTRACT

An educational device for teaching collating, assembling, and fastening skills. The invention includes a board having a top surface and a bottom surface. The top surface of the board is divided into a plurality of separate compartments. These compartments include a holding compartment having means for individually holding a supply of distinct papers to be collated. Additionally, the board includes a collating compartment for organizing distinct papers from the holding compartment into a collated set. A fastening compartment is also included on the board having means for fastening together papers into a collated set from the collating compartment. In a preferred embodiment of the invention, the board also includes a storage compartment for storing collated, fastened papers from the fastening compartment. A retaining rib on the bottom surface of the board retains the board on a work surface.

15 Claims, 5 Drawing Figures

EDUCATIONAL DEVICE FOR TEACHING COLLATING SKILLS

BACKGROUND OF THE INVENTION

This invention relates to an educational device for teaching basic, practical skills for a specific purpose. Specifically, this invention relates to an educational board teaching tool for teaching young children. Handicapped persons or persons with learning disabilities the skill of collating papers and fastening the papers together into a collated set.

Educational devices for teaching various basic learning skills are well-known. For example, U.S. Pat. No. 2,415,342 discloses a block and base educational system for teaching reading and arithmetic in which the blocks have projections which fit into recesses on the base. The system of projections and recesses is arranged such that the blocks will fit only in a single position on the base, thus teaching proper numerical arrangement or spelling. U.S. Pat. No. 3,024,541 discloses a spelling board which includes a plurality of rectangular depressions formed on a base board. Rectangular sections of cardboard, or blocks, on which are printed individual letters of the alphabet and the corresponding numbers 1-26 are placed within the depressions. Other such educational teaching devices are also well-known.

SUMMARY OF THE INVENTION

The present invention provides an educational device which may be used by young children, handicapped persons, or persons with a learning disability. The educational device of the present invention is intended to teach a specific skill, that being collating papers and fastening these papers together into a collated set. It will be appreciated, of course, that elements other than "papers" may also be collated and assembled using the present invention. The term "papers" is used merely to describe a preferred embodiment.

The skill of collating and assembling papers, while seemingly simple, involves a number of complex motor skills. For example, papers must be individually and serially selected from each of several individual paper-holding areas. Maintaining the original organization of the papers, the papers then must be assembled using a paper-fastening device, such as a stapler. The present invention not only teaches this basic skill but, when utilized by handicapped or learning-disabled persons, the invention can be used for vocational training or as a tool for performing a work assignment.

The present invention provides a self-contained educational device for teaching collating, assembling, and fastening skills. The invention includes a board having a top surface and a bottom surface. The top surface of the board is divided into a plurality of separate compartments. These compartments include a holding compartment having means for individually holding a supply of distinct papers to be collated. Additionally, the board includes a collating compartment for organizing distinct papers from the holding compartment into a collated set. A fastening compartment is also included on the board having means for fastening together papers into a collated set from the collating compartment. In a preferred embodiment of the invention, the board also includes a storage compartment for storing collated, fastened papers from the fastening compartment.

In a preferred form of the invention, the invention uses a plurality of dividers to divide the holding compartment into a plurality of separate and distinct holding areas. Each of the distinct pages to be collated is thus able to be placed into one of these separate and distinct holding areas. Preferably, the dividers are substantially perpendicular to the top surface of the board and are removably fixed to the top surface of the board.

The preferred way of fastening together papers into a collated set is to use a common fastening device such as a stapler. It is intended that the stapler will be removably fixed to the board by providing a retaining cage fixed to the top surface of the board which will hold the stapler firmly and securely in place.

Each of these compartments is preferably formed by dividing strips fixed to the top surface of the board.

DETAILED DESCRIPTION OF A PREFERRED EMBODIMENT

The present invention comprises a generally flat board 10 having a top surface 12 and a bottom surface 14.

In a preferred form of the invention, the board is sized so that it is easily handled by a single person and will fit on a desk-sized work station.

Board 10 is generally surrounded by a raised rim or border 16, which extends around at least a substantial part of the periphery of top surface 12 and projects upwardly therefrom. Dividing strips divide top surface 12 into a plurality of separate compartments, as will be described below.

Figure 1:
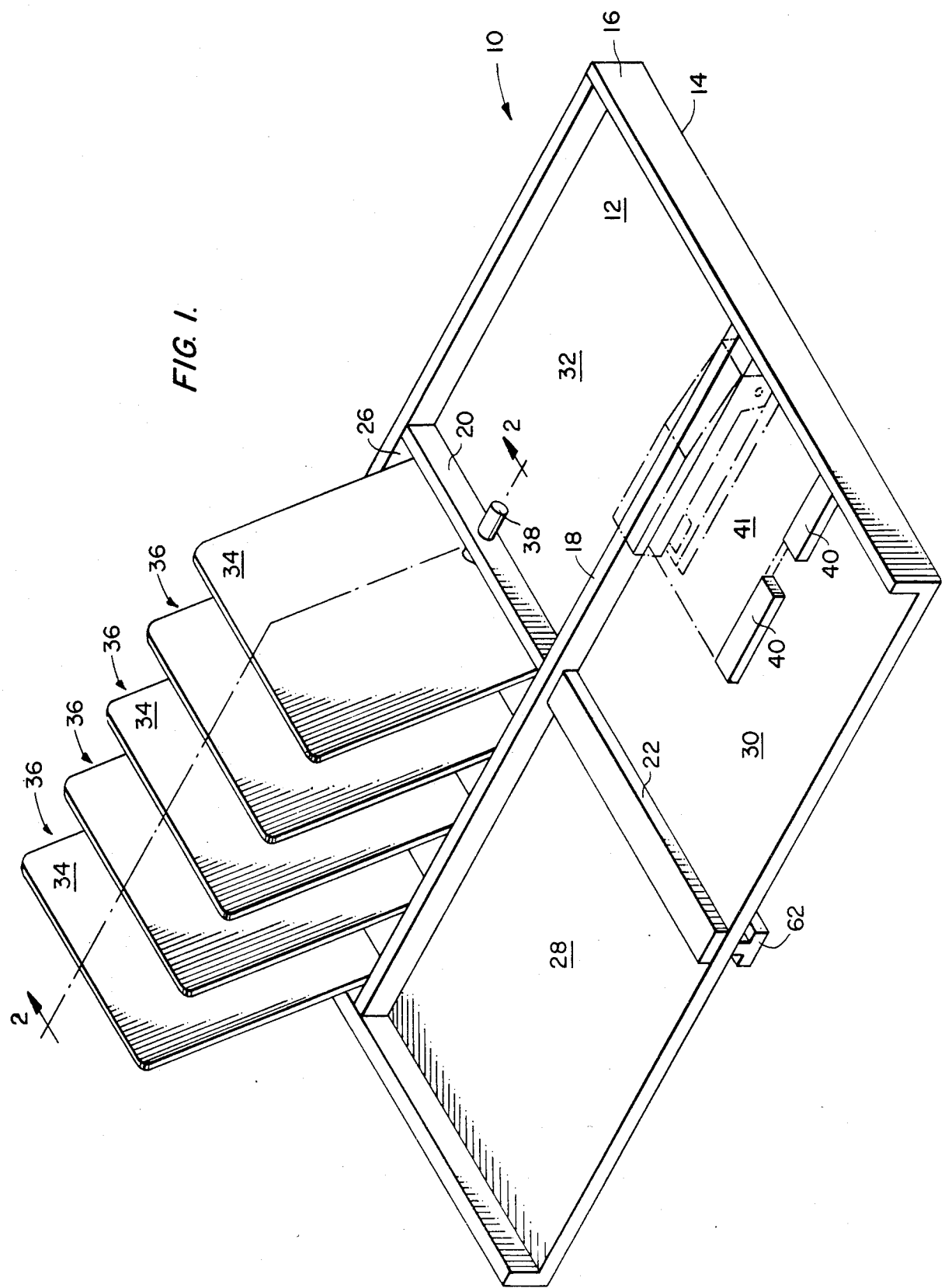
FIG. 1 is a general perspective view of an educational device according to the present invention.
Figure 2:
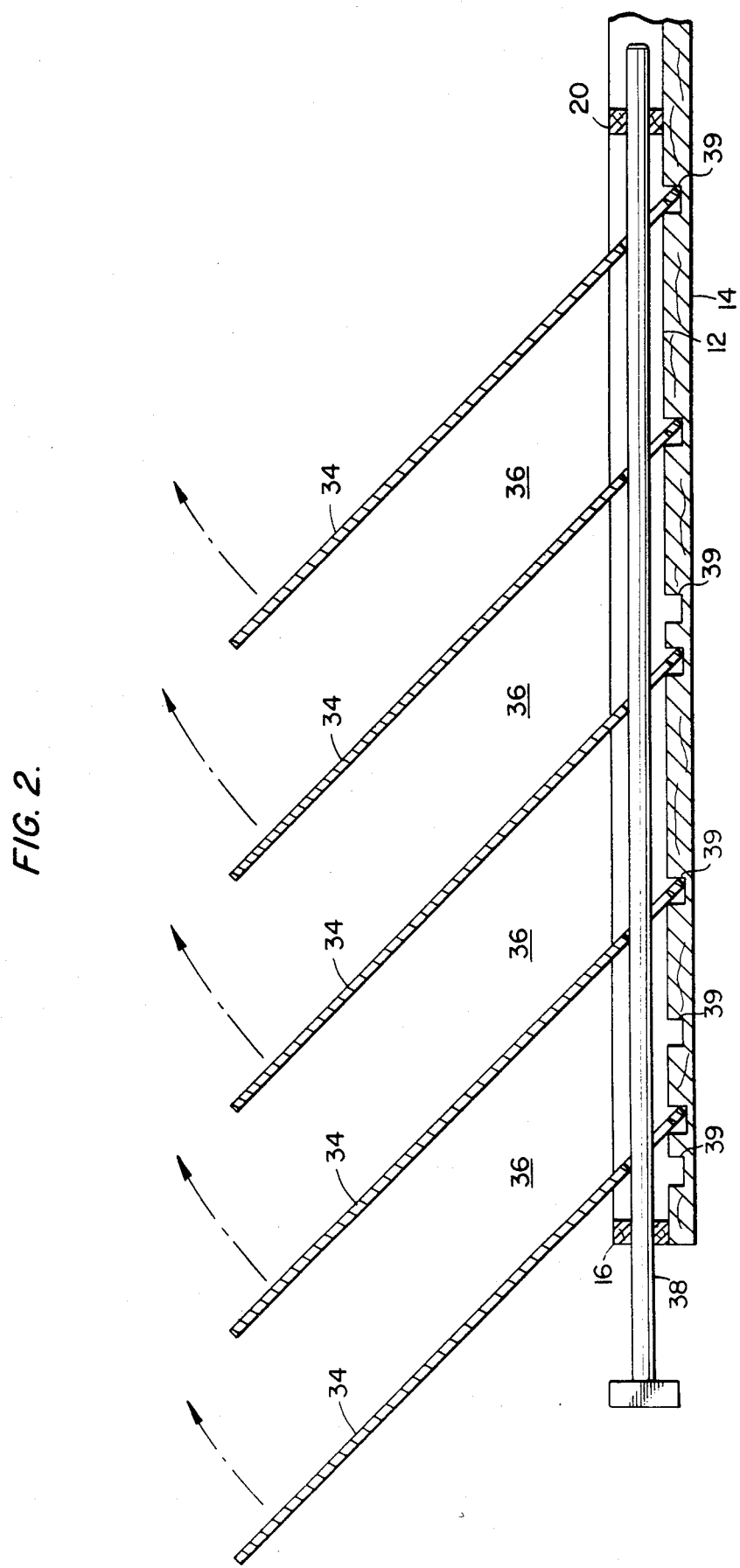
FIG. 2 is a sectional view taken along line 2—2 of FIG. 1.

A dividing strip 18 extends horizontally across the entire top surface 12 of board 10. Each end of dividing strip 18 abuts against rim 16, as shown in FIG. 1.

In the preferred form of the invention, a dividing strip 20 extends from the peripheral rim 16 at the top of board 10 to dividing strip 18. A third dividing strip 22 extends from dividing strip 18 to the periphery at the bottom of board 10. Raised rim 16 may be omitted from this bottom peripheral edge to facilitate use of board 10 as will be explained below. Preferably, dividing strip 22 lies in the same vertical plane as dividing strip 20. Thus, dividing strips 18, 20, and 22 divide top surface 12 of board 10 into four equally sized compartments, including a holding compartment 26, a collating compartment 28, a fastening compartment 30, and a storage compartment 32. As shown in FIG. 1, the holding compartment is preferably positioned in the upper left quadrant of board 10; the collating compartment is preferably positioned in the lower left quadrant of board 10; the fastening compartment is preferably positioned in the lower right quadrant of board 10, and the storage compartment is preferably positioned in the upper right quadrant of board 10. This arrangement of compartments is preferred because it allows papers to be easily removed from the holding areas defined by dividers within the holding compartment, as will be described below, into the collating compartment. It also provides an educational benefit in providing a logical counterclockwise progression of steps used by the teaching device of the present invention. It will be appreciated, however, that the four preferred compartments of the present invention may be oriented in other positions on board 10 without departing from the scope of the present invention.

Holding compartment 26 preferably includes a plurality of dividers 34 which divide holding compartment 26 into a plurality of separate and distinct holding areas 36. Preferably, dividers 34 are substantially perpendicular to top surfaces 1 and 2 of board 10. As shown in FIG. 1, dividers 34 may be slightly angled with respect to top surface 12 but, as shown, dividers 34 are oriented so that holding areas 36 will be substantially vertically oriented.

Each of the dividers 34 is removably fixed to board 10 by a retaining rod, shown generally at 38, and retaining slots 39 cut into top surface 12. Slots 39 may be placed in various positions within compartment 26 to allow for variable placement and number of dividers 34. This facilitates storage and handling of the educational board.

Collating area 28 is a substantially unobstructed area in which papers may be placed flat against top surface 12. Preferably, the boundary strips 16, 18, and 24 defining collating area 28 define an area of approximately the size of the papers which are being collated to assist in organizing the papers in a uniform fashion.

Fastening compartment 30 includes retaining strips, shown generally at 40, fixed to top surface 12. Retaining strips 40 are intended to securely grip and retain a fastening device, such as a stapler, within fastening comparment 30. Retaining strips 40 are constructed to define a boundary with rim 16 and boundary strips 18 and 24 around the fastening device. The fastening device may be fixed to base member 41 to facilitate its retention by retaining strips 40. Retaining strips 40 are positioned within fastening comparment so that a collated set of papers placed within the compartment will be fastened in an appropriate position.

Figure 3:
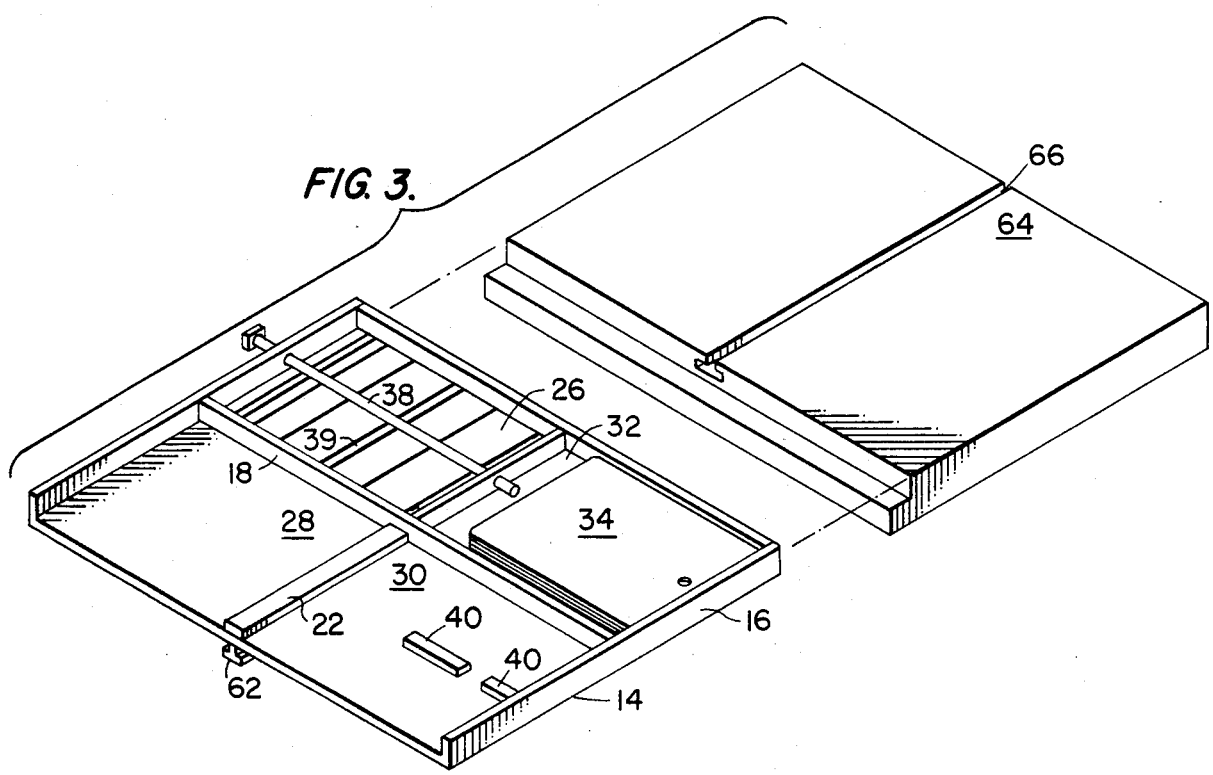
FIG. 3 is an exploded perspective view of an educational device and retaining board according to the present invention.
Figure 4:
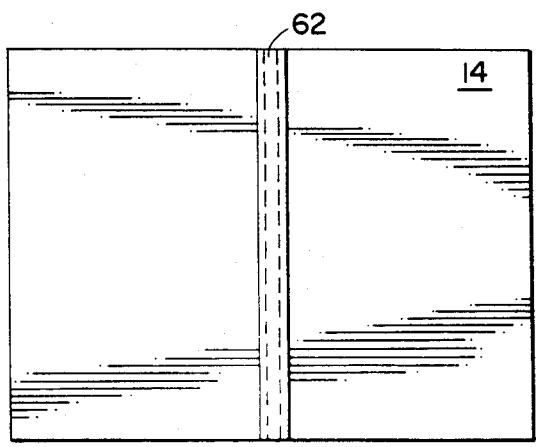
FIG. 4 is a bottom plan view of an educational device according to the present invention.
Figure 5:
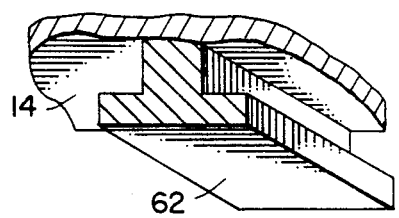
FIG. 5 is a partial cut away bottom view of an education device according to the present invention.

Storage compartment 32 includes a substantially clear, uninterrupted area for storing completed, collated, fastened sets of papers. As shown in FIG. 3, dividers 34 may be stored within compartments 32 when board 10 is not in use.

In operation, individual distinct papers to be collated are inserted within each of holding areas 36. The papers are inserted in serial fashion in the order in which they are to be assembled. The student serially selects one page from each of the distinct holding areas 36 and collates these pages within collating compartment 28. The dividing strips and raised rim defining collating compartment 28 facilitate in organizing neatly the papers to be collated. The student will be expected to recognize the proper orientation of papers and to so collate them. The collated set of papers is then fastened together in fastening compartment 30 using any conventional fastening device. As described above, the fastening device is intended to be securely fixed to top surface 12 by retaining strips 40 within fastening compartment 30. After the papers are fastened together, they are placed within storage compartment 32.

In a preferred form, the educational device will be placed on a desk, table, or other work surface. It is desirable to have positive means for retaining the educational device on the table or work surface. Preferably, board 10 may have a retaining rib 62 formed on bottom surface 14. Board 10 may alternatively be retained in place by a peg and slot arrangement in board 10 and the work surface. Board 10 may be secured to a work table by an elastic strap, not shown. The elastic strap would be removably fixed to the outside surface of peripheral border 16 on opposite ends of board 10 so that it could pass under the work surface and thus retain the board in place.

In a preferred form, retaining rib 62 will be securely fixed to bottom surface 14 and will have a cross-section of an inverted "T." This retaining rib is intended to be slid into a retaining groove of complementary shape formed on the work table (not shown) so that board 10 will be positively positioned on and securely held to work table. The arrangement of elements may be reversed, with the retaining rib on the work table and the retaining groove in board 10. Alternatively, in order to avoid the need to cut grooves into a work table that may have other uses, a separate retaining board 64 may be provided. Retaining board 64 has an inverted T-shaped groove 66 cut into its surface. Groove 66 is sized and shaped to be complementary to retaining rib 62 so that retaining rib 62 may be slid into and retained within groove 66. Retaining board 64 is designed to be of sufficient mass to serve to retain board 12 in position on a work table.

Although a preferred form of the invention has been shown and described, the invention is not intended to be limited thereby. Numerous modifications and changes will be obvious to those of ordinary skill, and the invention is defined only by the follwing claims.

We claim:

1. An educational device comprising:
a board having a top surface and a bottom surface, said top surface divided into a plurality of compartments, including
a holding compartment having holding means for individually holding a supply of distinct papers to be collated;
a collating compartment for organizing distinct papers from said holding compartment into a collated set; and
a fastening compartment having retaining means for retaining a removable fastening device for fastening together papers in a collated set from said collating compartment.

2. The device as recited in claim 1, further comprising a storge compartment for storing collated, fastened papers from said fastening compartment.

3. The device as recited in claim 1 wherein said holding means in said holding compartment comprises a plurality of dividers, said dividers dividing said holding compartment into a plurality of separate and distinct holding areas.

4. The device as recited in claim 3 wherein said dividers are substantially perpendicular to said top surface of said board.

5. The device as recited in claim 4 wherein said dividers fit within retaining slots and said top surface and are removably fixed to said board by a retaining rod.

6. The device as recited in claim 1 wherein said retaining means comprises a retaining strip fixed to said top surface of said board.

7. The device as recited in claim 2 wherein said holding compartment, said collating compartment, said fastening compartment, and said storage compartment are formed by dividing strips fixed to said top surface of said board.

8. The device as recited in claim 1 further comprising securing means for securing said board to a work surface.

9. The device as recited in claim 8 wherein said securing means comprises a retaining rib on said bottom surface, said rib adapted to be retained in a groove on said work surface.

10. An educational device comprising:
- a board having a top surface and a bottom surface, said top surface divided into a plurality of compartments, including
  - a holding compartment having a plurality of dividers, said dividers dividing said holding compartment into a plurality of separate and distinct holding areas for individually holding a supply of distinct papers to be collated;
  - a collating compartment for organizing distinct papers from said holding compartment into a collated set;
  - a fastening compartment having retaining means for retaining a removable fastening device for fastening together papers into a collated set from said collating compartment; and
  - a storage compartment for storing collated, fastened papers from said fastening compartment.

11. The device as recited in claim 10 wherein said dividers are substantially perpendicular to said top surface of said board.

12. The device as recited in claim 11 wherein an end surface of each of said dividers fits within retaining slots on said top surface and are removably fixed to said board by a retaining rod.

13. The device as recited in claim 10 wherein said retaining means comprises a retaining strip fixed to said top surface of said board.

14. The device as recited in claim 13 further comprising securing means for securing said board to a work surface.

15. The device as recited in claim 14 wherein said securing means comprises a retaining rib on said bottom surface, said retaining rib adapted to be retained in a groove on said work surface.

* * * * *